United States Patent [19]

Bianco et al.

[11] 4,072,944
[45] Feb. 7, 1978

[54] IMMINENT COLLISION DETECTION APPARATUS

[75] Inventors: Joseph F. Bianco, Wakefield; Nicholas Senio, Bedford, both of Mass.; Russell B. Hawes, Nashua, N.H.; Donald B. Strang, Harvard, Mass.

[73] Assignee: Sanders Associates, Inc., Nashua, N.H.

[21] Appl. No.: 808,034

[22] Filed: Feb. 20, 1969

Related U.S. Application Data

[63] Continuation of Ser. No. 628,805, March 29, 1967, abandoned.

[51] Int. Cl.² ............................ F42C 13/04; G01S 9/42
[52] U.S. Cl. ............................... 343/7 PF; 102/70.2 P; 343/7.7
[58] Field of Search ................ 102/70.2 P; 343/5 PD, 343/7 PF, 18 E, 7.7, 17.1

[56] References Cited

U.S. PATENT DOCUMENTS

| 2,671,896 | 3/1954 | DeRosa ............................. 343/17.1 |
| 2,776,425 | 1/1957 | Altman ............................. 343/7.7 |
| 3,066,289 | 11/1962 | Elbinger ........................... 343/7.7 |
| 3,153,786 | 10/1964 | Byington .......................... 343/7.7 |
| 3,208,065 | 9/1965 | Gutleber et al. ................ 343/17.1 |
| 3,270,339 | 8/1966 | McEuen et al. .................. 343/7 |

OTHER PUBLICATIONS

"Radar System Engineering" by Louis N. Ridenour, McGraw-Hill Book Company, 1947, pp. 635-638.

*Primary Examiner*—Malcolm F. Hubler
*Attorney, Agent, or Firm*—Louis Etlinger; Richard I. Seligman

[57] ABSTRACT

Apparatus is herein disclosed for imminent collision detection equipment for acknowledging proximity between a first object carrying the equipment and a second object. The imminent collision detection apparatus is a radio distance measuring device and includes a transmitter and a receiver. The transmitter has a pulsed energy output which is reflected back by a target and mixed with a reference source of pulsed energy generated a predetermined time after the transmitted output and coherent thereto. The coherent feature of the equipment lies in the fact that the transmitter pulsed output and the pulsed reference signals are both generated with the same starting phase each generated pulse. Furthermore, the transmitted and reference signals are jittered to provide a resistance to countermeasures capability.

12 Claims, 3 Drawing Figures

INVENTORS
JOSEPH F. BIANCO
NICHOLAS SENIO
BY Richard J. Seligman
ATTORNEY

IMMINENT COLLISION DETECTION APPARATUS

This is a continuation of application Ser. No. 628,805, filed Mar. 29, 1967 now abandoned.

BACKGROUND OF THE INVENTION

Increased missile speeds have brought about fuzing problems of a significant magnitude. The current and prior art proposed systems, such as those which rely on nuclear radiation techniques to bring about detection, are replete with problems. Inherently, nuclear radiation techniques are plagued by the problem of handling radioactive material needed to obtain sufficient neutron bombardment of an approaching target or the provision of sufficient high velocity beta particles.

Other approaches have suggested themselves, such as the reliance on near field phenomena which employs magnetic balance or electrostatic balance systems. The principal disadvantage of these systems lies in the requirement that the system be very delicately balanced to permit a relatively minor disturbance at only ten feet. In addition, prior art microwave systems have not been able to provide sufficient range resolution to be trustworthy.

Optical systems suffer from inability to reasonably detect range, from high probability of false alarms on clouds and on the sun, and from inability to operate satisfactorily at night.

Infrared systems suffer from difficulties in determining range and from jamming by the sun.

In pulsed and CW radar systems presently used for imminent collision detection, the separation of signals reflected from objects within the specified range from spurious signals requires complex equipment, with relatively complicated adjustments required to change the range of interest.

The invention to be described hereinafter is unparalleled in its efficiency, compactness of size, and its resistance to countermeasures.

SUMMARY OF THE INVENTION

Briefly, the invention comprises apparatus for detecting the presence of objects located within a specified limited area, while being insensitive to the presence of objects outside the specified region. The critical region is determined by the azimuth beamwidth of the antenna system, in conjunction with the waveforms of the transmitter signal and a receiver reference signal. Important applications for such apparatus are as an imminent collision device suitable to detect a target for a missile, or detonate a bomb when in close proximity to the ground.

The apparatus is basically a radar system which transmits a burst of radio frequency energy, and compares the energy of the return echo to a reference second burst of energy in a correlation process. This second burst of energy need not be precisely the same frequency as the first burst of energy, but must be coherent thereto. Only that portion of the return echo energy which is time-coincident with the second burst of energy is selected for further processing. The minimum range for which a return signal is time-coincident with the reference burst is determined by a time delay between the end of the transmitted signal and the start of the reference signal. For example, if the transmitted and reference bursts were each of single-cycle duration, the maximum range for time coincidence is determined by the pulse width, that is, the period of the transmitted signal. For a transmitted signal which extends for some number of cycles $n$, the range for which coincidence occurs is greater by that number $n$ than for a single cycle.

In order to provide effective resistance to countermeasures, the time between transmitted bursts is varied in a random manner, so that the correlation process can select without ambiguity those returns which originate in the area of interest.

In carrying out a simplified embodiment of the invention, a radio frequency oscillator which is properly coupled to a transmitting antenna is pulsed in such a manner that it oscillates for a predetermined number of cycles. The oscillator is operated so that it has the same starting phase each time it is pulsed. The precise number of cycles in the transmitted pulse is controlled by a pulse generator operated from a clock or PRF generator, and the time between pulses is controlled by a noise generator. A second oscillator is also controlled to generate in the receiver a reference pulse. The reference pulse is generated with the same starting phase as the transmitted pulse. The reference pulse is generated a predetermined time after the transmitted pulse, and is employed as the receiver local oscillator signal in a mixer which has as its other input the return echo from the transmitter signal. Any energy entering the mixer through a receiving antenna is multiplied by the local oscillator signal. Signals of interest are selected by filtering. The filtered output can be used in a variety of ways, for example to trigger an alarm or detonate an explosive.

For use at higher radio frequencies where it is not feasible to transmit sufficient energy in a single pulse, it is necessary only to apply the above outlined concepts to the modulation waveform on a high-frequency carrier. The range characteristics are then determined by the modulation waveform.

Accordingly, it is an object of this invention to provide an improved imminent collision detection system that includes an active radio ranging system employing coherent pulsed transmissions.

Another object of this invention is to provide an improved fuzing system that utilizes broadband noise to counteract countermeasures jamming.

An additional object of this invention is to provide imminent collision detection apparatus employing a pulsed radar system utilizing random pulse repetition frequency and signal correlation techniques.

BRIEF DESCRIPTION OF THE DRAWINGS

The above-mentioned and other features and objects of this invention will become more apparent by reference to the following description, taken in conjunction with the accompanying drawings, in which.

DESCRIPTION OF THE PREFERRED EMBODIMENTS

Figure 1:
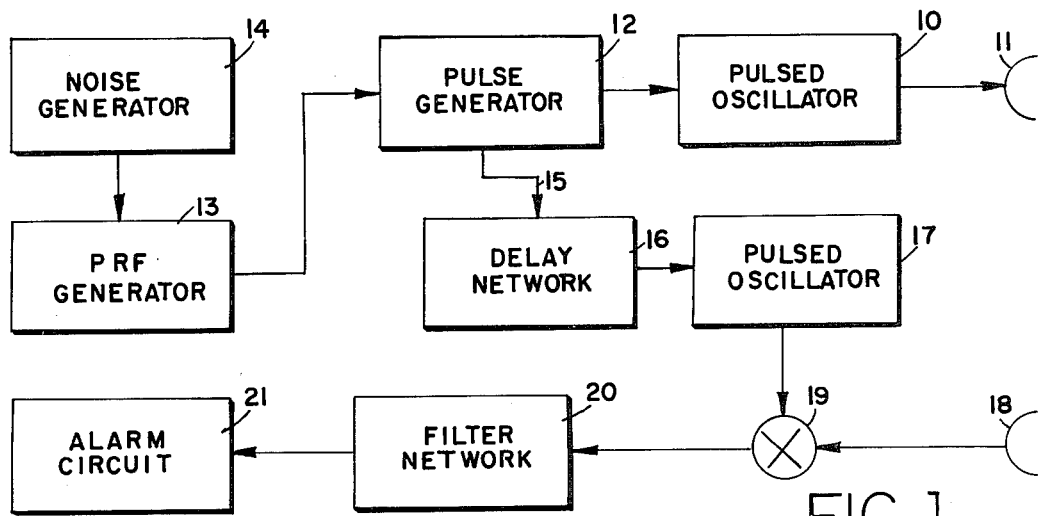
FIG. 1 is a simplified conceptual block diagram of a fuze system embodying the invention.

Referring now to FIG. 1, there is illustrated thereby by a simplified conceptual imminent collision detector (or fuze) system embodying the invention. A radio frequency oscillator 10 is pulsed in such a manner as to cause it to oscillate for a predetermined period of time. The oscillations are transmitted by a transmitting antenna 11. The oscillations have the same starting phase each time oscillator 10 is pulsed. A pulse generator 12, operating from a clock or PRF generator 13, controls the exact number of cycles in the pulse transmitted by antenna 11.

Reference may be had to our co-pending patent application, Ser. No. 511,624, filed Dec. 6, 1965, for a "Pulsed High Frequency Oscillator," which discloses an exemplary embodiment of radio frequency oscillator 10. Pulse generator 12 could be of any well-known configuration, for example, an avalanche pulse generator. PRF generator 13 is a free-running pulse generator, for example, a multivibrator or relaxation oscillator.

In this illustrative embodiment the time between pulses from oscillator 10 is controlled by pulse generator 12 with a noise generator 14. Noise generator 14, in an exemplary embodiment, comprises a noise diode and amplifier arrangement.

An output 15 from pulse generator 12 is coupled via delay network 16 to a second oscillator 17 which supplies a receiver reference pulse. Oscillator 17, which acts as the receiver local oscillator, oscillates with the same starting phase as that of oscillator 10. The use of a separate reference oscillator instead of a sample of the transmitted waveform is dictated by several factors, including the fact that transmitter power would be reduced and/or an RF amplifier would be required to provide sufficient reference power to mixer 19. Obviously, the use of a sampled reference signal is within the scope of the invention.

Return echoes for the transmitted pulses, received at an antenna 18, are mixed with the pulses from oscillator 17 at a mixer 19, with the output therefrom being applied to a filter network for further processing. The output from the filter 20 can be used to trigger an alarm 21 or, alternatively, if the device is within a bomb or missile, it could be employed to detonate same. The output from mixer 19 is a pulse train modulated by the doppler envelope.

This novel arrangement can be used to indicate a target moving relative to the device within specified distances from the source, and can discriminate against even much larger targets at approximately two feet greater distance. The apparatus is able to function in this manner in the presence of substantial levels of friendly interference or purposeful jamming.

Since this is a coherent radar system (the transmitter and reference waveforms both having the same starting phase), and in view of the fact that the PRF lines of the transmitter and reference spectrums are always exactly the same (the PRF of both pulses being generated by the same source), all doppler information on all PRF lines can be recovered, even if the transmitter and reference frequencies are somewhat different. Even if the transmitter and reference frequencies are somewhat different, all the sidebands fall one on the other, because both start at zero phase with a constant time delay between them generated at the same PRF.

The comparison technique used is one of cross-correlation which depends upon knowledge of the transmitted spectrum to obtain maximum correlation. When the reference delay produced by delay network 16 is equivalent to the range delay, the correlation function will rise to its maximum value.

A fuze constructed according to principles advanced with reference to the block diagram of FIG. 1 will have minimum vulnerability to jamming. Since the fuze in, for example, a missile is activated in the last few seconds of flight, the processing time available to a jammer is extremely short.

Because the radiated signal is a pulsed waveform with a random PRF, the spectrum of this signal appears as broadband noise. The reference generator has a similar spectrum, as is required to provide efficient cross-correlation with a reflected transmitter pulse. A jamming signal entering the mixer (or correlator) is multiplied (or mixed) by the reference signal, and the result is that the mixer output appears as broadband noise having a spectrum similar to the reference. This broadband noise is largely rejected by a narrowband filter which is just adequate to pass the target doppler signal.

Also, since the radiated signal is a pulsed random waveshape, for short observation periods it will appear as a wideband noise signal to a jammer. As a practical matter, the pulse lengths generated will be very short and the repetition rate very high; therefore, this will force a jammer to radiate noise continuously, since it is improbable that it can synchronize with the rep rate. The radiated signal energy is fixed, but by causing the jammer to distribute noise power over the entire band, his noise energy per cycle will be relatively low. Thus, the cross-correlation of noise from the jammer with the reference signal will never rise to a peak. The average value of such a correlation function is zero, and therefore, the fuze will not be detonated by the jammer.

Preferably, the PRF of the transmitter pulse is jittered to prevent a spot jammer from producing a beat with the PRF lines of the reference signal. Without jitter, the system can be deceived as easily as an ordinary pulse doppler radar. With jitter, the spectrum of the PRF lines will be smeared across the band, and thus, attempting to produce a beat with the PRF lines, for example by causing a swept frequency oscillator to sweep across a band, will be to no avail.

Although separate antennas are shown for the transmission and reception of signals, this is not neessarily the preferred configuration. A duplexer can be inserted, such that a single antenna can be employed.

The use of short pulses along with high PRF random pulse position modulation results in counter-countermeasures performance approaching that which is theoretically possible for a coherent pulse doppler system.

Figure 2:
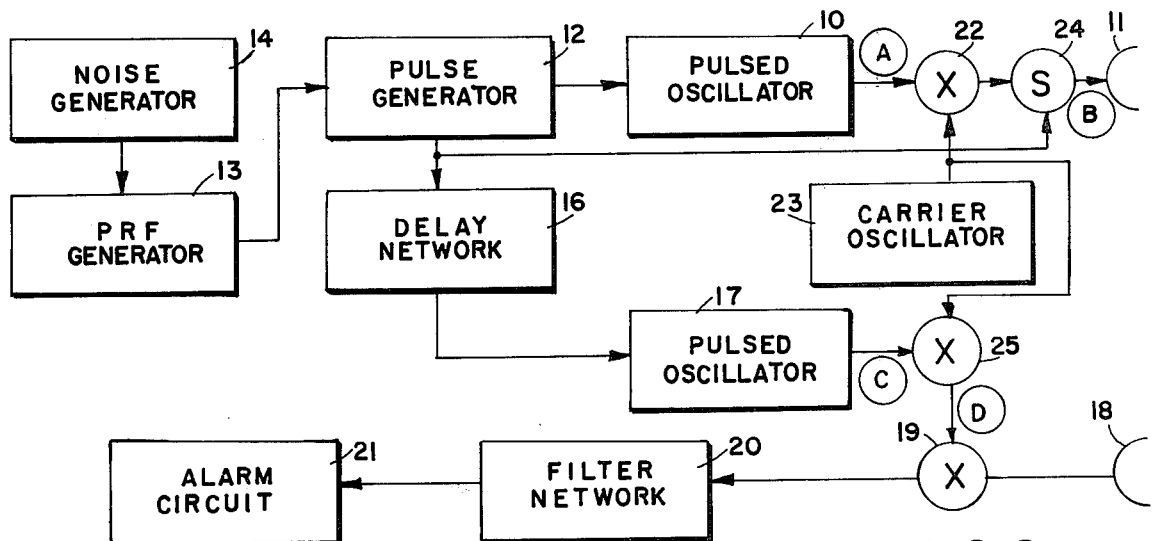
FIG. 2 is a block diagram of an embodiment of the invention.

In order to employ the subject techniques at higher radio frequencies where it is not feasible to transmit sufficient energy in a single pulse the system of FIG. 2 is used.

The simplified block diagram of FIG. 2 illustrates the changes required in the block diagram of FIG. 1 where a carrier signal is more suitable. Like reference designations are used for like apparatus. Noise generator 14, PRF generator 13 and pulse generator 12 are used to pulse pulsed oscillator 10 in similar manner to that described hereinbefore with reference to the embodiment of FIG. 1. The output from pulsed oscillator 10 is applied to a mixer 22, where it modulates a carrier which is generated by a carrier oscillator 23, the output from carrier oscillator 23 also being applied to mixer 22. The output of pulsed oscillator 10 is used to reverse the phase of the carrier at the output of mixer 22. A switch 24 turns off the transmitter between pulses.

The receiver for this system is similar to that already described herein. The prime difference is that the local oscillator signal for mixer 19 is obtained by modulating a portion of the output from carrier oscillator 23 with the output from pulsed oscillator 17 in a mixer 25.

Figure 3:
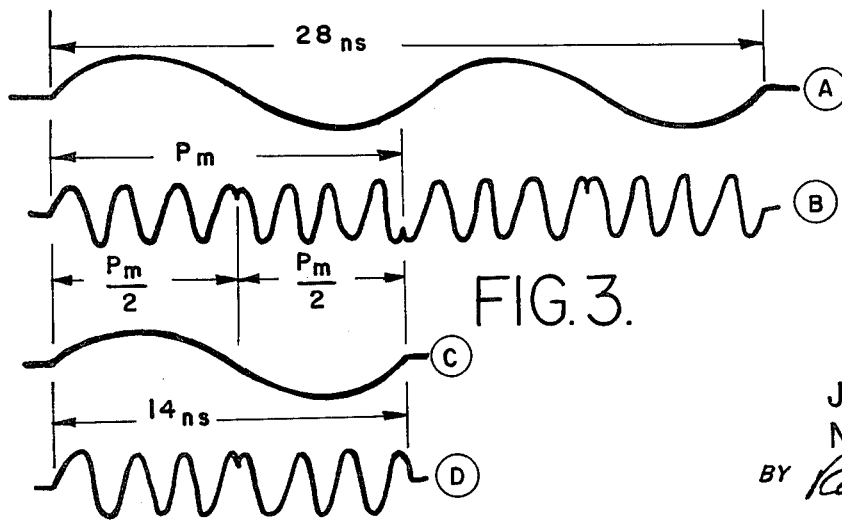
FIG. 3 illustrates typical waveforms derived from the embodiment of FIG. 2.

Typical waveforms generated by this system are illustrated in FIG. 3.

While we have described above the principles of our invention in connection with specific apparatus, it is to be clearly understood that this description is made only by way of example and not as a limitation of the scope of our invention as set forth in the accompanying claims.

We claim:

1. Apparatus for detecting imminent collision between a first object carrying said apparatus and a second object, comprising:
   means for transmitting a pulsed energy signal including a first pulsed oscillator which generates signals with the same starting phase each generated pulse;
   means for receiving a reflected signal from said transmitted signal;
   means for generating a pulsed energy reference signal coherent to said transmitted signal including a second pulsed oscillator which generates signals with the same starting phase as said first pulsed oscillator; and
   means for mixing said reflected and reference signals for producing a signal indicative of imminent collision.

2. Apparatus as defined in claim 1, further including means for generating said transmitted and reference pulses at a random pulse repetition frequency, thus precluding effective countermeasures.

3. Apparatus as defined in claim 1, further including means for generating said reference signal a predetermined time after said transmitted signal for providing a predetermined maximum proximity within which imminent collision will be indicated.

4. Apparatus as defined in claim 1, in which said means for transmitting a pulsed energy signal includes:
   a noise generator;
   a clock generator coupled to said noise generator; and
   a pulse generator coupled to said clock generator, said first pulsed oscillator being coupled to said pulse generator.

5. Apparatus as defined in claim 4, in which said second pulsed oscillator is coupled to said pulse generator.

6. Apparatus as defined in claim 5, further including a delay network coupled between said pulse generator and said second pulsed oscillator.

7. Apparatus as defined in claim 1, further including a filter network coupled to said mixing means.

8. Apparatus as defined in claim 7, further including an alarm circuit coupled to said filter network.

9. Apparatus as defined in claim 7, further including a detonator coupled to said filter network.

10. Apparatus as defined in claim 1, in which said means for transmitting a pulsed energy signal includes means for modulating a carrier with a pulsed oscillation.

11. A method for detecting imminent collision of a first object with a second object, comprising the steps of:
    transmitting a pulsed energy signal having a predetermined starting phase;
    receiving an echo of said pulsed energy signal from said second object;
    separately generating a pulsed energy reference signal coherent to said transmitted signals said reference signal having the same starting phase as said transmitted signal; and
    mixing said reference and received signals for producing a doppler signal.

12. The method of claim 11, further including transmitting said transmitted signal with a smeared spectrum.

* * * * *